Patented Aug. 13, 1929.

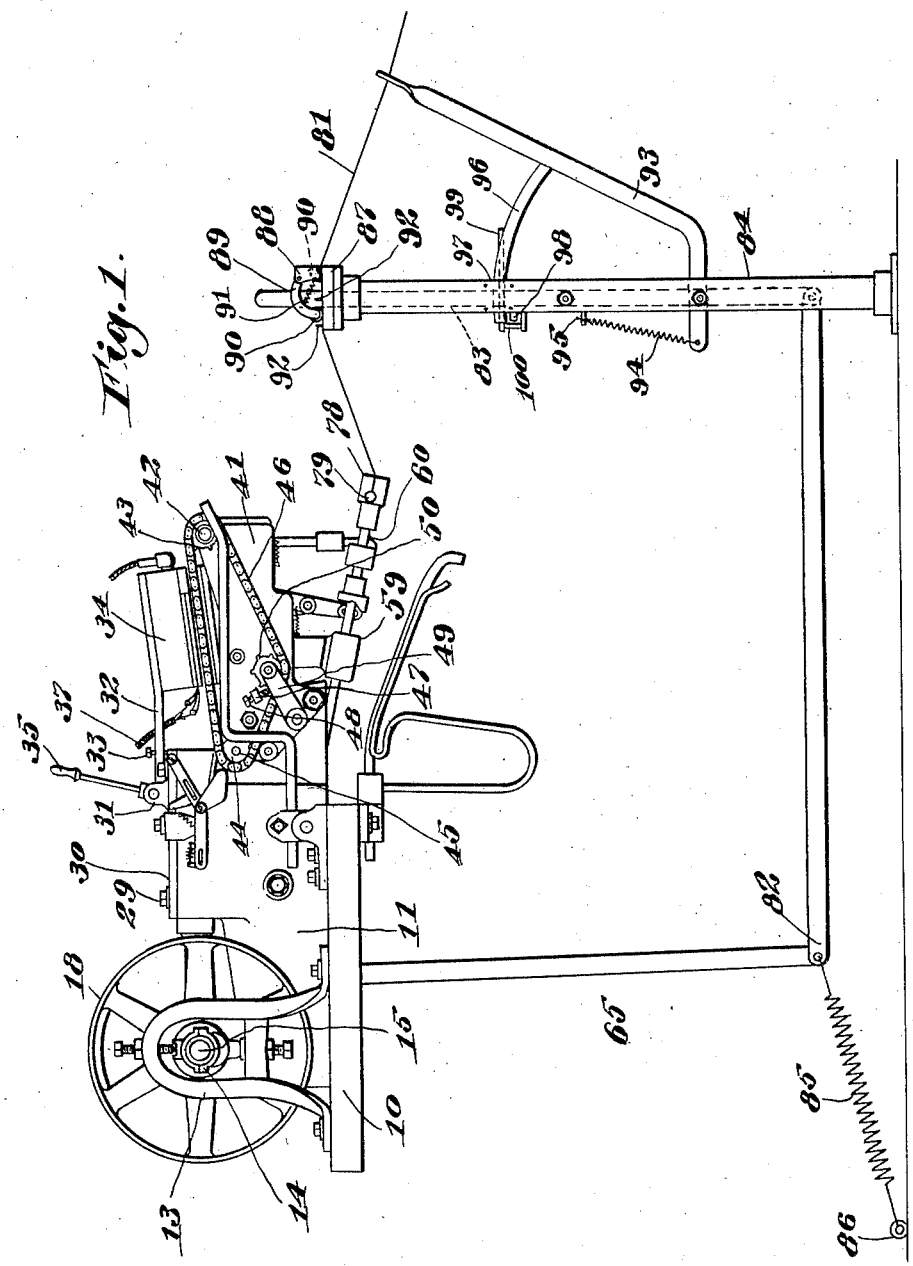

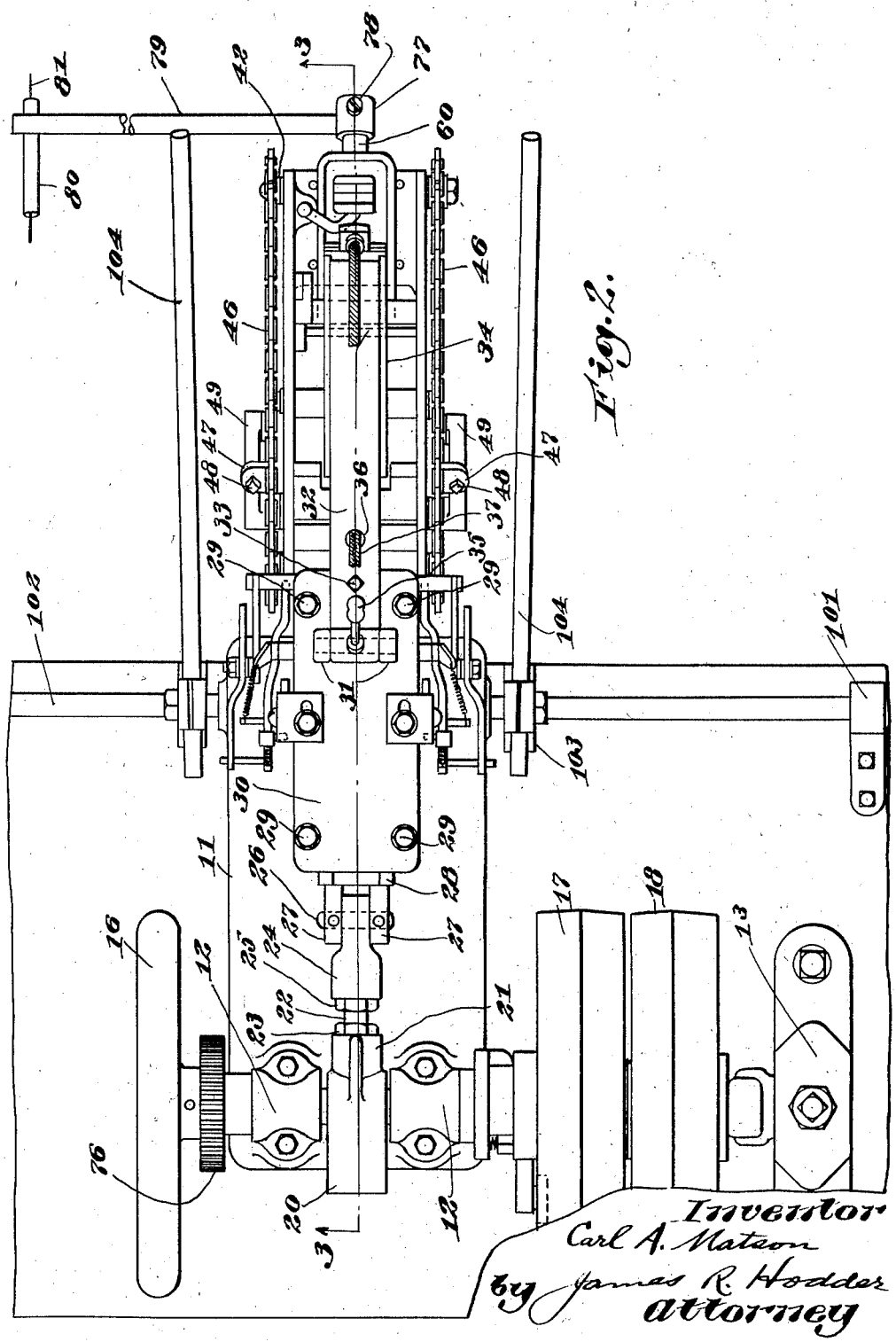

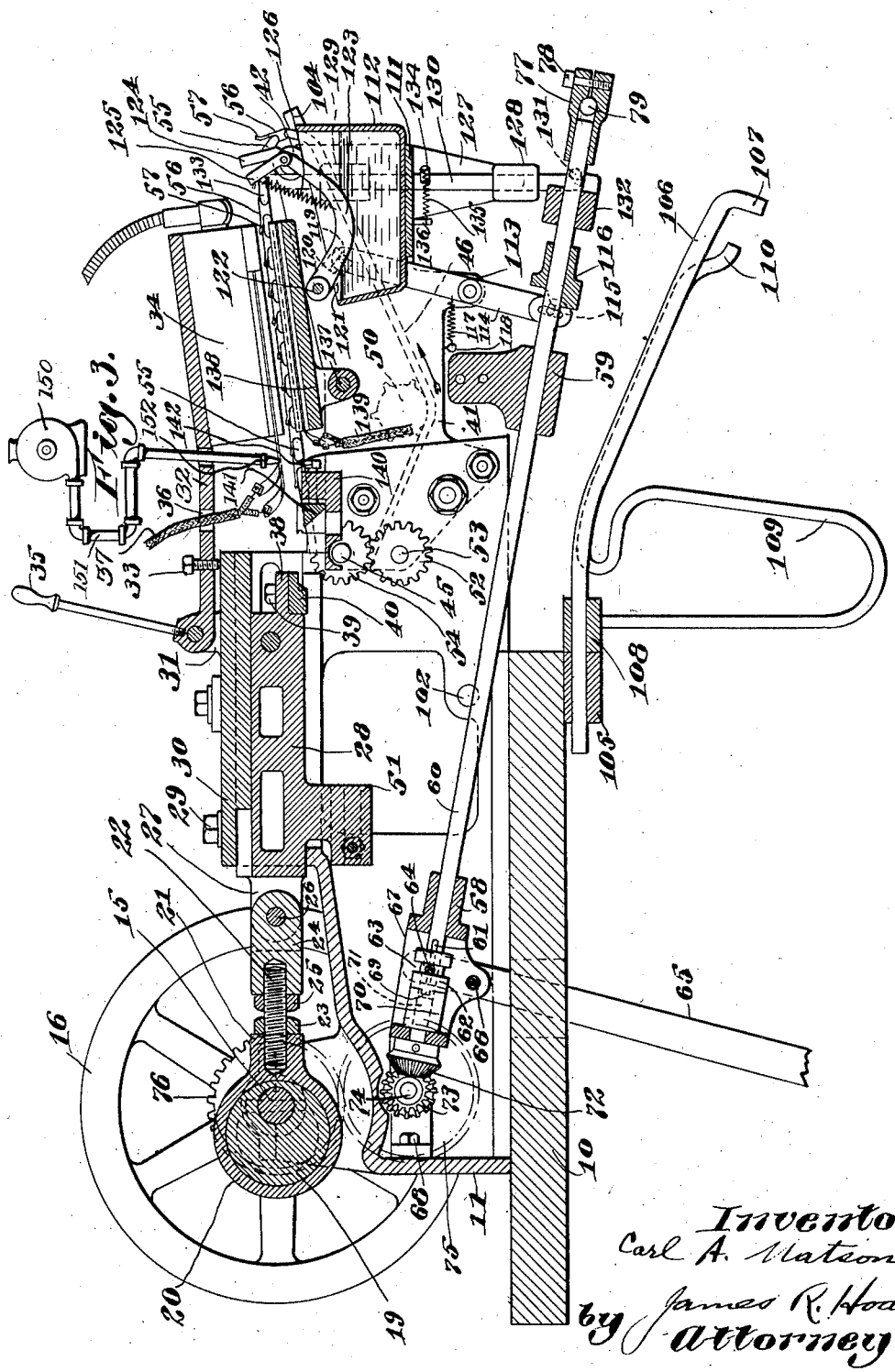

1,724,212

UNITED STATES PATENT OFFICE.

CARL A. MATSON, OF LYNNFIELD CENTER, MASSACHUSETTS, ASSIGNOR, BY MESNE ASSIGNMENTS, TO SHOE LACE COMPANY, LTD., OF PROVIDENCE, RHODE ISLAND, A CORPORATION OF RHODE ISLAND.

PROCESS OF TIPPING LACES.

Application filed January 2, 1923. Serial No. 610,141.

My present invention relates to a novel and improved process of lace tipping, and more particularly to the formation of a non-metallic tip for laces, shoe laces, corset laces, and the like.

In my development of the lace tipping art, I have discovered that the tipping operation can be performed rapidly, continuously, efficiently and at a relatively high speed compared to former processes by the use of a method characterized by the application of so-called "fabric" tips. In Letters Patent of the United States No. 1,486,838, granted March 11, 1924, on my application I have shown and described a machine suitable for carrying out my process, and in Letters Patent of the United States No. 1,605,965, granted November 9, 1926, on my application I have illustrated certain improvements in said machine.

For the manufacture of "fabric tips" or non-metallic lacing tips, I have devised a process which includes, first, the preparation of suitable moldable material in a fluid state; then passing the lacing material adjacent to this mass of moldable material, thereupon applying to a predetermined section of the lacing a sufficient mass of the moldable material to impregnate a length of lacing equal to the length of two lace tips; thereupon conveying the lacing thus impregnated with moldable material through a treating zone of predetermined length to prepare the impregnated portion of the lacing for molding in a die; and finally the simultaneous molding and severing of the impregnated portion centrally thereof, thereby forming two lace tips simultaneously.

In the accompanying drawings I have illustrated my preferred machine as shown in said Letters Patent No. 1,486,838 in order more clearly to describe the present process. Said Letters Patent may be referred to for more detailed illustration and elucidation of the operation of the machine in all of its aspects.

In the accompanying drawings,

Fig. 1 is a side elevation;

Fig. 2 is a plan view, and

Fig. 3 is a vertical longitudinal section on the line 3—3 of Fig. 2.

Referring to the drawings, 10 (Fig. 1) designates a base suitable for mounting on a bench or pedestal, as may be desired, and secured to the base in any suitable manner is a hollow frame 11 having formed integrally therewith, and at one end thereof, bearings 12 (Fig. 2). Secured to the base 10 at one side of the end thereof is a bearing standard 13 provided with an adjustable bearing 14 in alinement with the bearings 12, and in the bearings 12 and 14 is rotatably mounted a shaft 15 having secured at the end remote from the bearing 13 a hand or fly wheel 16, while mounted on the shaft 15 between one of the bearings 12 and the bearing 14 are tight and loose pulleys 17 and 18 respectively. Secured to the shaft 15, and between the bearings 12, is an eccentric 19 (Fig. 3) about which is fitted an eccentric strap 20. This eccentric strap 20 is provided with a boss 21 drilled and tapped to receive one end of a connecting stud 22, a lock nut 23 being utilized to hold the stud 22 in adjusted position with relation to the boss 21. The other end of this stud 22 fits into a threaded hole in one end of a connecting member 24, a lock nut 25 being utilized to hold the connecting member 24 in adjusted position with relation to the stud 22 and therefore in adjusted relation to the strap 20. The other end of the connecting member 24 is pivotally connected by a shaft 26 to a pair of lugs or ears 27 formed integral with a crosshead 28 that is slidably mounted in the hollow frame 11. Bolts 29 threaded into the frame 11 bear on the cover plate 30 which constrains the crosshead 28 in only a reciprocating motion in the frame 11. Formed integral with, and on the top of the cover plate 30, are lugs or ears 31 in which is pivotally mounted a plate 32. The bolt 33 passes through the plate 32 and engages with the cover plate 30, as clearly shown in Fig. 3, whereby the position of the plate 32 with respect to the cover plate 30 may be adjusted for the purpose of varying the relative position of certain parts to be hereinafter described, carried by the plate 32. Secured to the under side of the free end of the plate 32 is an electric heating unit 34. This plate 32, adjacent its pivotal connection with the cover plate 30, is provided with an operating handle 35 by the use of which the free end of the plate 32 and, therefore, the heating unit 34, may be raised for facilitating inspection, replacement, or for any other purpose. This plate 32 is perforated at 36 to provide a hole for electric conductors 37 leading from a suitable source of current to the heating unit 34.

Formed in the end of the crosshead 28 at the end remote from the connecting member 24 is an extension 38 to the under side of which is secured by bolts 39 a cutter and former 40 for a purpose to be heinafter described.

Secured to the side of the frame member 11, and extending in alinement therewith at the end of the frame remote from the shaft 15 are bearing plates 41 (Fig. 1). At the end of the plates 41 are bearings in which is rotatably mounted a shaft 42 carrying at its ends and outside of the plate 41 sprocket wheels 43 in alinement with sprocket wheels 44 secured to a shaft 45 that is rotatably mounted forwardly of the shaft 42, but in the frame member 11. Over these sprocket wheels 43 and 44 run feed chains 46, the particular construction and function of which will be hereinafter described. Formed integral with each side plate 41 and on the outside thereof is a lug 47 through which is threaded a bolt 48, the end of which engages a pivoted lever 49 pivotally mounted on the plate 41 and having rotatably mounted at its free end a sprocket wheel 50 that meshes with each feed chain 46, as clearly shown in Figs. 1 and 3, the lever 49 and sprocket wheel 50 and adjustable bolt 48 acting as means for regulating the tension of the feed chains 46.

Formed integral with, and extending downwardly from the lower surface of the crosshead 28 is a member 51 (Fig. 3) to which is connected and associated various elements adapted for driving a gear 52 rotatably mounted on a shaft 53 secured in the bearing plates 41 intermittently with the reciprocatory motion of the crosshead 28 due to a continuous rotation of the shaft 15, the gear 52 in turn driving with an intermittent rotary movement a gear 54 secured to the shaft 45. The mechanism connected to, and associated with, the member 51 and with the gear 52 have not been shown and will not be described or further referred to as they form no part of the present invention. It is sufficient for the purpose of the present invention to note that reciprocatory motion of the cross head 28 and parts carried thereby produces an intermittent motion to the feed chains 46 and particularly to the upper reach of the feed chains extending between the sprockets 43 and 44.

The feed chains 46 are each composed of a plurality of side plates 55 and blocks 56, the blocks having extension 57 at one end thereof which extends over the succeeding pair of plates 55. From this construction, and as clearly shown in Fig. 3, it is evident that, as the feed chains 46 move in the direction of the arrow shown, the extension 57 will separate from the side plates 55 as the chain moves over the sprocket wheels 43 and as the chain moves onto the straight reach extending between the sprockets 43 and 44 such extensions 57 will move toward the side plates 55 and will grip any article, as a shoe lace, that may be in position between such side plates 55 and extension 57. Also it will be obvious that, as the chain moves over the sprockets 44, the extension 57 will separate from the side plates 55, thereby releasing any article such as a shoe lace, that may have been gripped by such members.

Within the hollow frame 11, and formed integral therewith, is a bearing 58, and attached to the side plates 41 and depending downwardly therefrom is a bearing 59, while rotatably mounted in the bearings 58 and 59 is a shaft 60 that lies at an angle to the horizontal, as clearly shown in Fig. 3. The end of this shaft 60, within the frame member 11, is provided with a slot 61, and encircling this end of the shaft is one element 62 of a clutch, which clutch element is provided with a circumferential groove 63 in which works a pin 64 attached to the upper end of an operating lever 65 pivotally mounted at 66 to a member 67 that is secured to the wall of the frame member 11 by bolts 68. This clutch element 62 is provided with a key (not shown) that engages with the slot 61, thus allowing longitudinal movement of the clutch element 62 with respect to the shaft 60, while forcing such element to rotate with the shaft. The extreme end of the clutch element 62 is provided with a tongue 69 that engages with a groove in a collar 70 secured to a stub shaft 71 that is rotatably mounted in a portion of the member 67, this stub shaft 71 having secured thereto a bevel gear 72 that meshes with, and is driven by, a bevel gear 73 secured to a shaft 74 rotatably mounted in bearings in the frame member 11. The shaft 74 extends outwardly beyond the limits of the frame member 11 and has secured to its outer end a gear 75 that meshes with, and is driven by, a gear 76 secured to the main drive shaft 15. When the clutch elements 62 and 70 are brought into engagement with each other, as shown in Fig. 3, rotation of the main drive shaft 15 will cause a rotation of the shaft 60. Secured to the end of the shaft 60 remote from the clutch element 62 is a clamp 77 provided with a clamping bolt 78, this clamp being utilized to clamp in position a rod or tube 79 that extends laterally from, and at right angles to, the shaft 60, as clearly shown in Fig. 2. Secured to the outer end of the rod or tube 79 is a short section of tube 80 and through which the lacing 81, or other material to be operated on, passes, as will be hereinafter described. The lower end of the operating lever 65 has pivotally attached thereto one end of a link 82 (Fig. 1), the other end of which is pivotally attached to the lower end of a lever 83 pivotally mounted on a hollow standard 84 located on the floor of the room or building with the apparatus above described and spaced from the end of the rotating shaft 60. Secured to the pivotal connection of the operating lever 65 and connecting rod 82 is one end of a coil spring 85, the other end of which spring is connected to an eye 86 secured to the floor of the arm or building and the function of this spring is to so force the operating lever 65 as to keep the clutch elements 62 and 70 out of engagement with each other to thereby hold the shaft 60 stationary.

Secured to the top of the standard 84 (Fig. 1) is a member 87 which has secured to its surface and at one side thereof, a bearing member 88 in which is pivotally mounted a U shaped member 89 having rotatably mounted at the ends thereof rollers 90 which engage with the top surface of the member 87, a spring 91 being secured one end to the U shaped member 89 and the other end to the bearing member 88. Secured to the top of the member 87 are a plurality of eyes 92 and through which is reeved the lacing 81, which passes under the rollers 90. This construction constitutes a device for tensioning the lacing 81. Pivotally mounted on the standard 84 at a point intermediate between its ends is a lever 93, the upper free end of which is provided with a hole or eye through which passes the lacing 81 while the other end has attached thereto one end of a coil spring 94, the other end of this coil spring being attached to a pin 95 secured to the standard 84. This spring 94 tends to hold the free end of the lever 93 in its most outward position with respect to the standard 84. The lacing 81 ordinarily is brought to the machine on a reel (not shown) and is led through the hole or eye in the lever 93, under the rollers 90, through the eyes 92, and then through the tube 80 attached to the end of the tubular arm 79. Pivotally secured to the lever 93 at a point between the free end of such lever and its pivotal connection to the standard 84 is an arcuate member 96, the free end of this member passing through a slot 97 in the standard 84. Secured to the standard 84, adjacent to, but beneath the arcuate member 96, is a bearing member 98 to which is pivotally attached a latch member 99, this latch member being provided with an arm 100 that lies in the path of movement of the arcuate member 96, such member 99 being also provided with a bevelled hook on its end for engaging with the pivotally mounted lever 83. A spring (not shown) is provided on the latch member 99 for holding the notch therein in its most outward position to engage with the lever 83.

On the end of the base 10, on each side of, and adjacent to, the frame member 11 remote from the drive shaft 15 are pillow blocks 101 (Fig. 2) in which is rotatably mounted a shaft 102. On this shaft at each side of the frame member 11 are adjustably mounted carriers 103, these carriers being adjustable longitudinally of the shaft 102 and each provided with the split end in which is adjustably mounted a curved rod 104, these rods 104 extending outward from the frame member 11 to a point beneath and adjacent the shaft 42, as clearly shown in Fig. 1. Secured to the lower end face of the base 10 beneath the shaft 102 and practically in alinement with the shaft 60 is a member 105 (Fig. 3) in which is adjustably mounted a curved bearing 106 that extends outwardly and downwardly to a point substantially under the shaft 42, the extreme outer end of this bearing 106 being provided with a substantially hook-like member 107. Mounted on the base 10 adjacent the member 105 is a block 108 having secured therein, on either side of the bearing 106, a rod 109, this rod extending downwardly, then upwardly, then outwardly substantially forwardly to the bearing 106 and then downwardly at 110, this portion 110 defining, with the hook-like member 107, an opening into which the lacing 81 is fed by the rotating arm 79. As the main drive shaft 15 rotates, it imparts an intermittent step by step movement to the feed chains 46 in the direction of the arrow shown in the drawings which, as they pass upwardly over the sprockets 43, define a substantially V shaped opening between the successive members of the feed chains and simultaneously with this intermittent step by step movement of the feed chains there is a continuous rotation of the shaft 60 carrying the right angularly extending arm 79 that in turn carries the short length of tube 80 and through which passes the lacing 81, as above described.

Assuming that the clutch members 62 and 70 are in engagement with each other and the lacing is reeved through the short length of tube 80 and having its end tied to an appropriate link of the feed chains, and the shaft 15 rotated in the usual manner, it will be evident that the shaft 60 rotates in unison with the intermittent motion of the feed chains 46 and that the upper portion of the loops will be fed into the substantially V shaped opening between the elements of the feed chains 46 and that the lower portion of such loops will be fed between the hook-like members 107 and 110, it being assumed that the hole or eye in the free end of the pivoted lever 93 is of such diameter as to allow the lacing 81 to pass freely therethrough. If, however, there is present in the lacing a defect such, for example, as a knot that would prevent the lacing from feeding freely through said hole then, when the surplus that has passed through said hole has been fed onto the feed chains by the rotating arm 79, the tension exerted on the free end of the arm 93 will be sufficient to overcome the tension of the spring 94 and the arcuate member 96 will be moved to the left, as shown in Fig. 1, through the slot 97 where the end of such arcuate member 96 engaging the arm 100 will rotate the latch member 99 about its pivot point, moving the latch portion thereof from engagement with the lever 83, releasing the same, whereupon the spring 85 will act to move the lever 65 to such a position as to throw the clutch elements 62 and 70 out of engagement with each other, thereby stopping further feeding of the lacing 81.

Extending between the side plates 41 is a shelf 111 (Fig. 3) on which rests, or is secured, as may be desired, the tank 112 which holds the moldable material. On one of the side plates 41 is a depending arm 113 on which is pivotally mounted, intermediate between its ends, a lever 114, the lower end of this lever being provided with a laterally extending pin 115 that extends into the path of, and is engaged by, the cam 116 secured to the shaft 60 which cam causes an oscillating or rocking movement of the lever 114 about its pivotal point. Secured to the lever 114 at a point above the pivotal connection thereof on the arm 113 is one end of a coil spring 117, the other end of which is connected at a point 118 to the side plate 41. The upper end of the lever 114 is provided with a laterally extending pin 119 that engages in a slot 120 in a lever arm 121 attached to a shaft 122 rotatably mounted in bearings in the side plates 41. Secured to the shaft 122, and in such position as to dip into the tank 112, is a curved arm or lever 123, the outer or free end of this arm being bent, as shown at 124, and adjacent this portion 124 is a pivotally mounted jaw 125 near the upper end of which is secured one end of a spring 126, the other end of this spring being attached to the arm or lever 123 at a point intermediate between its ends. The rocking movement of the lever 114 will, through the lever arm 121, impart a rocking movement to the arm 123, to feed a predetermined portion of moldable material from the tank 112 upward to the lacing.

Formed integral with, and depending from one of the side plates 41 is a member 127 provided at its lower end with a bearing member 128 and near its top end with a bearing member 129, these bearing members being in alinement with each other and rotatably supporting a shaft 130, the lower end of which is bent outwardly, as shown at 131, and is adapted to be engaged by a cam 132 secured to the shaft 60, while at the top end is secured a laterally extending curved arm 133 (Fig. 2), the end of which is engaged by the pivotal jaw 125, the cam 132 being timed and having a face of such proportions as to move the pivotal jaw 125 into engagement with the end 124 of the lever 123 when such lever 123 is in its uppermost position. Secured to the shaft 130 at a point intermediate between its ends and below the shelf 111 is a radially extending arm or pin 134, to the other end of which is secured one end of a coil spring 135, the other end of this spring being secured to a depending pin 136 secured to the under face of the shelf 111. The function of this spring is to insure the return of the shaft 130 to its initial position after having been moved to its extreme outward position by the cam 132. The movement of the arm 123 is so timed with relation to the intermittent motion of the feed chains 46 that, as the loops of lacing 81 are intermittently fed forward by such chains, the end of the arm 123 will dip into the moldable material in the tank 112 and will carry a predetermined portion thereof upward into engagement with the loop of lacing 81. Mounted on a shaft 137, secured to the side plates 41 is a heating element 138 which lies beneath, and extends parallel to, the upper reach of the feed chains 46, feed wires 139 leading from a source of power to furnish heating power for such heating element.

Situated between the feed chains 46 and near the sprockets 44, but between the sprockets 44 and 43 and integral with the member 11 is a cross bar 140 on which is located a combined cutter and forming block 141 that is adapted to cooperate with the block 40 carried by the crosshead 28, bolts 142 being utilized to effect relative adjustment between such block 141 and the block 40. For details of the specific construction of the blocks 40 and 141, reference is hereby made to Letters Patent No. 1,486,838 above mentioned.

The molded or moldable material contained in the tank 112 is, when in solution, too fluid in character to be quickly and efficiently set by the co-action of the blocks 40 and 141 and, therefore, the speed of travel of the feed chains 46 is so regulated with regard to the length of the heating elements 34 and 138 that the amount of molded or moldable material placed on the loops of the lacing 81 by the members 124 and 125 carried by the arm 123 will have attained such a degree of temperature and consistency by the time the loop of lacing 81 reaches the blocks 40 and 141 as to be in the most suitable condition for setting. If the molded or moldable material in the tank 112 is in powdered form, the degree of heating and the duration of the application of such degree of heat by the heating elements 34 and 138 properly conditions the powder so as to cause it to be quickly and efficiently set by the blocks 40 and 141.

While I find that ordinarily the preheating treatment is sufficient and most desirable for the conditioning of the tipping material and lacing, yet I also contemplate a plurality of pretreating or conditioning actions, such for example as a combination of both heat supply and air supply, the latter under pressure and with a cooling temperature if desired. Such a source of air supply is indicated at 150 with a pipe 151 leading therefrom to a nozzle 152 that is located adjacent the die blocks 40 and 141. In fact I find that the use of the heating device immediately after the moldable material has been applied to the lacing and then the cooling by an air current, preferably a relatively cool air current, just as the material is fed into the die, permits greater speed of operation, without heating up or gumming the die and this combination of both heating and air cooling seems to effect a better, harder, and more glossy finish on the completed "fabric tip."

In the attached drawings I have not illustrated any particular form or method of supplying air current, either to the material or to the die for the relative cooling action, but in actual practice I find it suitable to utilize a small air pump which may be positioned in convenient proximity to the die to impinge a current of air onto the tipped lace part, and, if desired, onto the die itself, just as the lacing is fed into the die, which air current will not detract from the action of the preheating zone and appears to cooperate most efficiently in combination with the preheating in its effect on the conditioning of the tipped lace. I have discovered that this method permits me to speed up my present machine to a capacity of approximately two hundred and fifty gross per eight hour day.

My invention is further described and defined in the form of claims as follows:

1. The improved process of tipping lacing by non-metallic material, which consists in supplying said material in moldable form to a predetermined portion of the lace, conveying that portion of the lacing so supplied while held at a plurality of spaced points under tension through a predetermined length of travel for a preliminary treatment of the moldable material, and then setting the moldable material and lacing in a die, simultaneously cutting the molded part intermediate its length.

2. That improvement in methods of tipping laces which comprises applying moldable material to a portion of lacing long enough for the formation of two lacing tips, applying molding pressure to the portion of lacing to which moldable material has been applied thereby setting and hardening the moldable material in lacing tip form, and severing the said portion of lacing intermediate between its ends before the completion of the molding.

In testimony whereof, I have signed my name to this specification.

CARL A. MATSON.